United States Patent [19]

Igashira et al.

[11] Patent Number: 4,546,749
[45] Date of Patent: Oct. 15, 1985

[54] FUEL INJECTION APPARATUS

[75] Inventors: Toshihiko Igashira, Toyokawa; Yasuyuki Sakakibara, Nishio; Seiko Abe; Hiroshi Koide, both of Okazaki; Kazuo Shinoda, Toyota, all of Japan

[73] Assignees: Nippon Soken, Inc., Nishio; Toyota Jidosha Kabushiki Kaisha, Tokyo, both of Japan

[21] Appl. No.: 532,912

[22] Filed: Sep. 16, 1983

[30] Foreign Application Priority Data

Sep. 17, 1982 [JP] Japan .................. 57-160776

[51] Int. Cl.⁴ ............................................ F02M 39/00
[52] U.S. Cl. .................................. 123/506; 123/458; 123/494
[58] Field of Search .............. 123/506, 357, 358, 359, 123/449, 494, 458; 73/119 A

[56] References Cited

U.S. PATENT DOCUMENTS

| | | | |
|---|---|---|---|
| 3,827,409 | 8/1974 | O'Neill | 123/458 |
| 3,880,131 | 4/1975 | Twaddell et al. | 123/450 |
| 4,199,977 | 4/1980 | Hilpert | 73/119 A |
| 4,351,283 | 9/1982 | Ament | 123/458 |
| 4,395,987 | 8/1983 | Kobayashi | 123/458 |
| 4,406,267 | 9/1983 | Sharma | 123/458 |
| 4,412,519 | 11/1983 | Hoch | 123/458 |
| 4,480,619 | 11/1984 | Igashira | 123/458 |
| 4,505,240 | 3/1985 | Shinoda | 123/458 |

*Primary Examiner*—Carl Stuart Miller
*Attorney, Agent, or Firm*—Cushman, Darby & Cushman

[57] ABSTRACT

In a fuel injection apparatus for an internal combustion engine, the fuel injection is ended by a spill mechanism provided in a spill passage communicating with a pumping chamber. A piston opening and closing the spill passage is a free piston, and a solenoid valve to open and close a cylinder in which the free piston is disposed, is also provided. As the solenoid valve closes the cylinder, the free piston closes the spill passage, thus enabling the fuel feed to the fuel injection valve. When the solenoid valve opens the cylinder, the free piston opens the spill passage. Thus, the fuel flows through the spill passage to the fuel reservoir.

4 Claims, 11 Drawing Figures

A ENERGIZATION OF SOLENOID VALVE (V)

B AMOUNT OF FUEL SUPPLY TO PUMP (mm³/deg)

C GAP OF PISTON (mm)

D ENGINE PHASE SIGNAL (V)

E ENGINE REFERENCE POSITION SIGNAL (V)

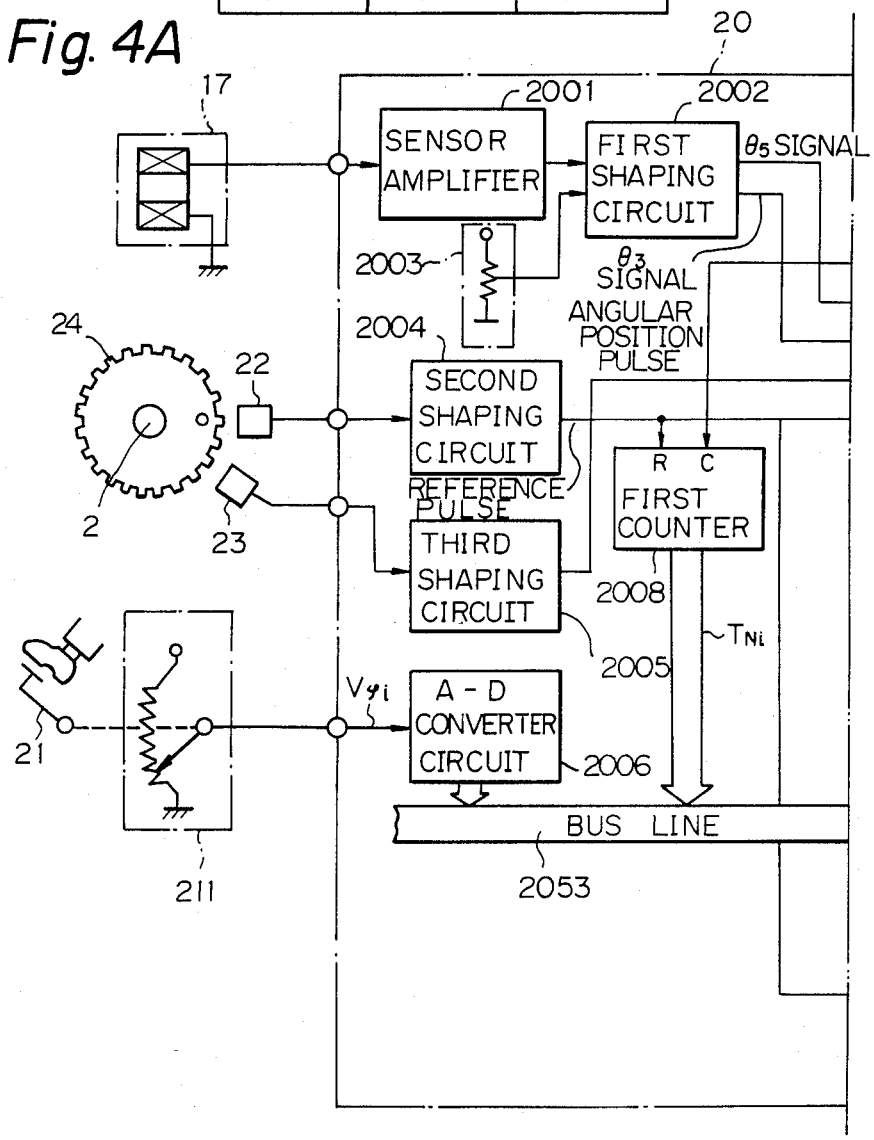

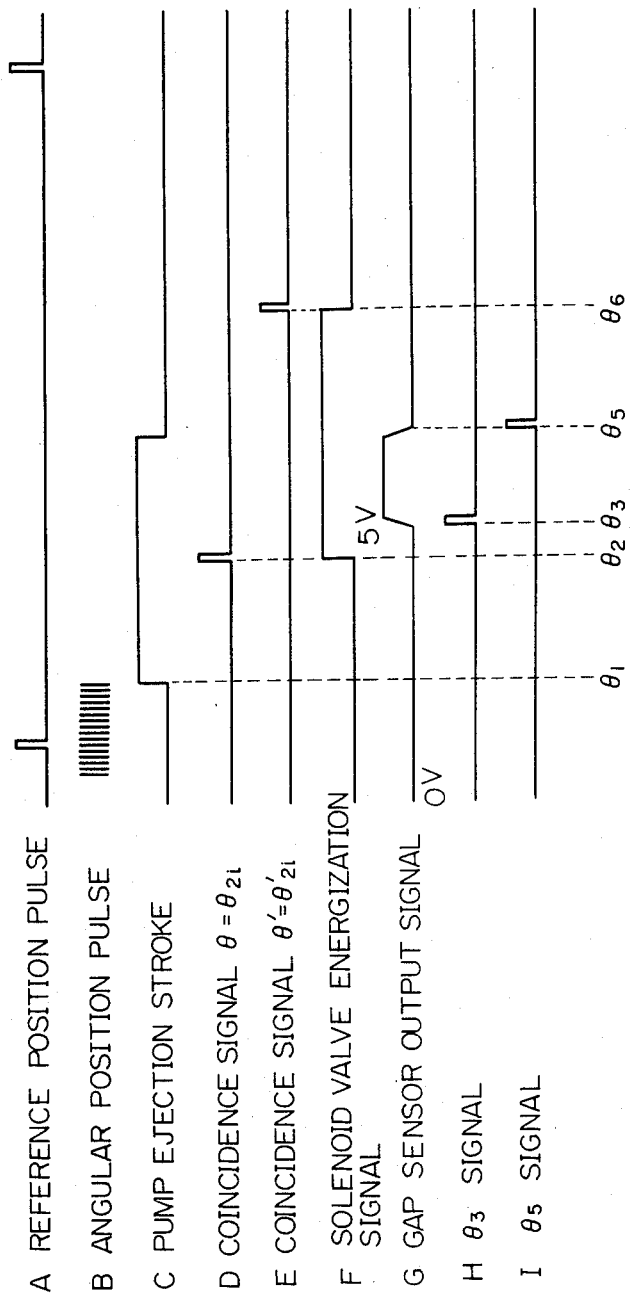

FUEL INJECTION APPARATUS

BACKGROUND OF THE INVENTION

1. Field of the Invention

The present invention relates to a fuel injection apparatus for an internal combustion engine, more particularly to an improved spill mechanism by which the fuel pressure within the pumping chamber of such internal combustion engine is reduced to stop the supply of fuel to the fuel injection valve.

2. Description of the Prior Art

In a fuel injection apparatus like a fuel injection pump, fuel injection is usually stopped by spilling the fuel from the pumping chamber to the fuel reservoir at a selected time during the ejection stroke of the pump, thereby reducing the pressure within the pumping chamber. In recent years, many proposals have been made to adopt a solenoid valve in such mechanisms for the purpose of spilling the fuel from the pumping chamber to the fuel reservoir. These proposals were made to allow electronic control of the amount of fuel injection from the fuel injection valve.

In such conventional spill mechanisms, however, if the aperture area or lift amount of the solenoid valve is made large for a sufficient spill amount of fuel, the response is correspondingly reduced. Also, the solenoid valve itself would have a rather large volume, which is not desirable from a structural viewpoint.

Furthermore, with prior art spill mechanism, as it is impossible to precisely sense when fuel was supplied to the fuel injection valve, the operation of the solenoid valve cannot be feedback-controlled. More particularly, the performance varies from one solenoid valve to another. Such performance variation cannot be eliminated and reflects directly upon the performance of fuel supply apparatus. As a result, it is impossible to control the supply amount of fuel with a high accuracy. Also, there is no way to accurately control the starting time of the fuel supply. Thus, it is difficult to positively improve the output power of the internal combustion engine.

SUMMARY OF THE INVENTION

Accordingly, the present invention has an object to provide a compact fuel injection apparatus which is capable of electronically controlling the amount of fuel injection from the fuel injection valve and still have excellent response.

Another object of the present invention is to provide a fuel injection apparatus which allows the control of the amount of fuel injection from the fuel injection valve with a high accuracy.

According to one aspect of the present invention, there is provided a fuel injection apparatus which comprises a pump casing in which a first cylindeer is formed; a plunger slidably arranged within the first cylinder and which forms within the first cylinder a pumping chamber, the moving of the plunger causing the liquid fuel to be ejected from within the chamber to a fuel injection valve of an internal combustion engine in which the fuel injection apparatus according to the present invention is adopted; means for supplyig the fuel from within a fuel tank of the engine into the pumping chamber; means for spilling a part of the fuel in the pumping chamber; and a solenoid valve which opens or closes the second passage. The spilling means includes a second cylinder which is communicated with the pumping chamber, a piston slidably provided in the second cylinder, a first passage for spilling the fuel, and a second passage to which pressure of a low pressure chamber can be led, this chamber being formed in the casing. The first passage is opened or closed by the piston. One end face of the piston is acted on by pressure of the pumping chamber, while the other end face of the piston is able to be acted on by pressure of the low pressure chamber. The piston normally closes the first passage and, when the pressure of the one end face is higher than the pressure of the other end face, is displaced to open the first passage.

It is preferred that a mechanism to sense the position of the piston within the second cylinder be provided. The valve position sensor mechanism receives information on the position of the piston and detects therefrom a duration of fuel spill to the fuel reservoir. The solenoid valve is so driven in accordance with the data of fuel-spilled period as to close the second passage, thus causing the piston to close the first passage, for supply of the fuel to the fuel injection valve, and on the other hand, as to open the second passage, thereby causing the piston to open the first passage, for spill of the fuel to the fuel reservoir.

It is also advisable that the valve position sensor mechanism detect, from information on the position of the piston, an end timing of fuel spill to the fuel reservoir. The driving system for the plunger controls the start timing of fuel supply to the fuel injection valve in accordance with the detected end point. The solenoid valve closes the second passage, for supply of fuel to the fuel injection valve, thereby causing the valve to close the first passage, and, on the other hand, opens the second passage, thus causing the piston to open the first passage for spill of the fuel to the fuel reservoir.

BRIEF DESCRIPTION OF THE DRAWINGS

The present invention will be better understood from the ensuing description made, by way of example, of the embodiments of fuel injection apparatus according to the present invention with reference to the accompanying drawings, wherein;

FIGS. 4A, 4B and 4C show a block diagram of the first embodiment, FIG. 4A, 4B and 4C being the left, central, and right part of the diagram, respectively;

FIG. 5 shows waveforms of various signals in the first embodiment;

DESCRIPTION OF THE PREFERRED EMBODIMENTS

Figure 1:
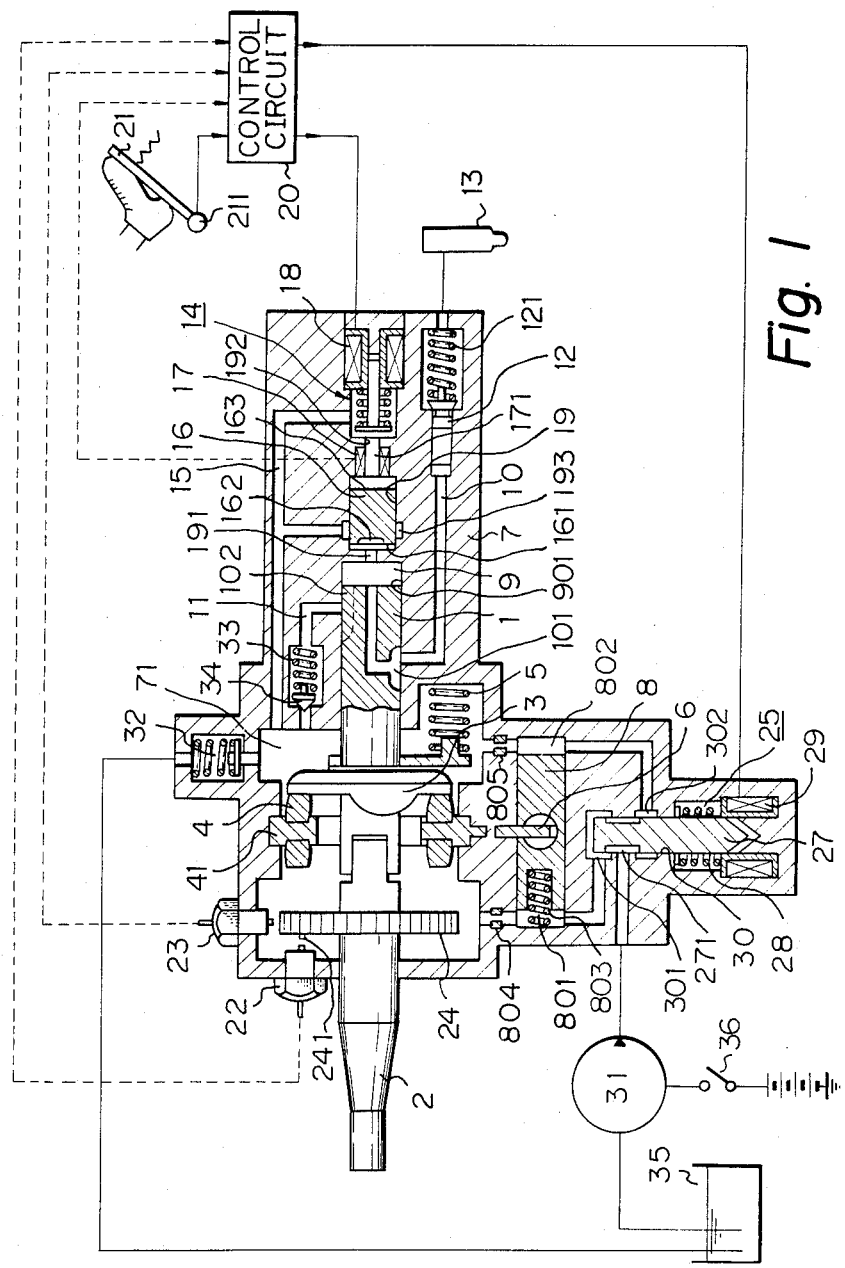
FIG. 1 is a sectional view of a first embodiment of a fuel supply apparatus according to the present invention.

In the first embodiment shown in FIG. 1, the fuel injection apparatus according to the present invention adopts a well known Bosch VE distribution type injection pump. The first embodiment is a basic version of fuel injection apparatus according to the present invention.

First, the well known part of the distribution type fuel injection pump will be outlined. A plunger 1 shown in FIG. 1 reciprocates turning in synchronism with a half of the speed of an internal combustion engine. The plunger 1 is given a turning force by a drive shaft 2 which is driven by means of a gear or timing belt by the engine. The force for reciprocation of the plunger is given from a face cam 3 provided integrally with the plunger 1. That is, the face cam 3 is engaged with a roller 4 as normally forced leftward by a spring 5, and the plunger 1 turns about the axis thereof, thus reciprocating along the cam-surface shape of the face cam 3. The roller 4 is supported by a roller ring 41 which is so pivoted by a lever 6 as to change the position in relation to a pump casing 7, thus allowing the adjusment of the reciprocating motion of the plunger 1. The roller ring 41 is pivoted with a force given by a timer piston 8.

It should be noted that the timer piston 8 is directed perpendicular to the plane of the drawing sheet in practice, but in FIG. 1 it is shown as turned 90° from the plane for the simplicity of illustration.

The plunger 1 is provided at the outer circumference thereof with as many intake ports 102 as the engine cylinders and a distribution port 101. As the plunger moves rightward, namely, when a pumping chamber 9 formed in the free end thereof is in the compression stroke, the distribution port 101 communicated with any one of as many distribution channels 10 as the engine cylinders to force out the fuel. When the plunger 1 moves leftward, that is, when the pumping chamber 9 is in the intake stroke, any one of the intake ports 102 communicates with an intake channel 11, thereby allowing the intake of fuel. Each of the distribution channels 10 is so designed as to be communicable with an external injection valve 13 via a delivery valve 12. The delivery valve 12 opens against the action of a spring 121, thus acting as a check valve. The intake channel 11 opens out in a constant pressure chamber 71 surrounded by the pump casing 7. Both the distribution channels 10 and intake channel 11 are formed in the pump casig 7. The first embodiment of the present invention has been described in the foregoing concerning the well known construction and functions of the distribution type pump.

The first feature of the inventive embodiment is a mechanism 14 for spilling the oil pressure in the pumping chamber 9, under electrical control. The spill mechanism 14 is composed of a free piston 16 which provides communication and interruption between the pumping chamber 9 and a spill passage 15, a valve position sensor mechanism, i.e., gap sensor 17 to detect the position of the free piston 16, and a solenoid valve 18 driving and controlling the free piston 16. The free piston slides within a cylinder 19 formed in the pump casing 7. The cylinder 19 has formed in the left end thereof a small hole 191 which is communicated with the pumping chamber 9, in the right end a small hole 192 which is opened and closed by the solenoid valve 18, and in the inner circumference an annular recess 193 which communicates with the spill passage 15.

The free piston 16 has a left end face 161 which can close the small hole 191 and allows the annular recess 193 to open to the inside of the cylinder 19 as the piston 16 slides rightward within the cyliner 19. The left end face 161 is provided with a concavity 162 which is coaxial with the small hole 191 and has a somewhat larger diameter that the small hole 191. Thus, when the free piston 16 is at the left end of the cylinder 19 with the left end face 161 thereof closing the small hole 191, the pressure in the pumping chamber 9 acts only on said concavity 162, not on the entire left end face 161.

Also the free piston 16 has a right end face 163 which is flat and of which the lateral displacement is detected by the gap sensor 17. The gap sensor 17 is a small coil coaxial with the free piston 16 and disposed at the right side of the free piston 16 as well as at the right end of the cylinder 19. The coil 17 is axially hollow in the center 171 thereof, and when the solenoid valve 18 is open, the oil at the right side of the free piston 16 within the cylinder 19 can pass through the hollow center 171 of the coil shaft and flow out of and into the spill passage 15 via the small hole 192. On the other hand, when the solenoid valve 18 is closed, the oil at the right side of the free piston 16 is confined in the cylinder 19. Thus, the free piston 16 is not permitted to move. The solenoid valve 18 is opened again when energized under the control of a computer 20.

The computer 20 energizes the solenoid valve 18 at specified timing and for a correct period in accordance with signals arriving at the computer 20 and indicative of the acceleration pedal angle and pump speed. The acceleration pedal angle signal is produced and sent by a potentiometer 211 provided to the acceleration pedal 21. The pump speed signal and engine phases signals for enabling correct timings of fuel supply are produced and transmitted by two (magnetic resistance element MRE) sensors 22 and 23 provided in the pump casing 7. These sensors 22 and 23 are provided respectively for detecting protrusions and for detecting concavity and convexity of a dice 24 which is fixed to the drive shaft 2 and rotated along therewith. The sensor 23 detects the concavity and convexity provided at intervals of 5° in the circumference of the disc 24, while the sensor 22 detects a protrusion 241 provided on the side face near the outer circumference of the disc 24. It should be noted that the gap sensor 17 also sends a signal indicative of the lateral displacement of the flat right end face 163 of the free piston 16 to the computer 20. Receiving this signal from the gap sensor 17, the computer 20 calculates an injection amount of fuel and corrects the timing of energization of the solenoid valve 18 if the calculated amount of fuel injection is different from a correct amount.

The embodiments of the present invention incorporate, as a second feature, a timer mechanism 25 to correct the position of the timer piston 8 when the starting time of fuel injection calculated by the computer based on the signal from the gap sensor 17 differs from a correct timing. The timer mechanism 25 uses, as an actuator, an oil pressure control valve which comprises a spool 27 slidable within a cylinder 30 and a linear solenoid 29 which attracts the spool 27 against the action of a spring 28. The spool 27 has provided in the outer circumference thereof an annular groove 271 to which fuel oil is supplied through a channel formed in the cylinder 30 from an external motor-driven feed pump 31. The cylinder 30 is provided with two annular grooves 301 and 302 so that the groove 271 comes between them. The groove 271 partially overlaps both the grooves 301 and 302. As the spool 27 is attracted by the solenoid 29, the area of the groove 271 overlapping the groove 302 is larger, while the area overlapping the groove 301 is smaller. The groove 301 communicates with an oil pressure chamber 801 formed in one end of the timer piston 8, and the groove 302 is led to another oil pressure chamber 802 formed in the other end. The oil pressure chamber 801 has provided therein a spring 803 which acts on the end face of the timer piston 8. The oil pressure chamber 801 is also led through an orifice 804 to the constant pressure chamber 71. The oil pressure chamber 802 is led through an orifice 805 to the constant pressure chamber 71. These orifices 804 and 805 have the same diameter. Therefore, as the solenoid 29 is energized, the spool 27 is attracted so that timer piston 8 moves in such a manner as to enlarge the volume of the oil pressure chamber 802. As a result, the roller ring 5 is pivoted, thus permitting to change of the time of fuel injection, as described. Note that the oil pressure within the constant pressure chamber 71 is kept at a constant level, for example, at 3 kg/cm$^2$, by means of a relief valve 32 provided on the pump casing 7.

The intake channel 11 is opened to the constant pressure chamber 71 through a check valve 34 which is under a preset force from a spring 33. This spring 33 opens the check valve 34 only when the differential pressure is, for example, over 1 kg/cm$^2$ and under 2 kg/cm$^2$. Therefore, while the feed pump 31 is out of operation, the intake channel 11 is closed by the check valve 34. The feed pump 31 is connected with the fuel tank 35 and is put into operation only when a switch 36 interlocked with the engine starter key switch is closed. Fuel relieved from the relief valve 32 returns to the fuel tank 35.

The position of the roller ring 4 determines when the plunger starts moving rightward in FIG. 1 according to the relation between the face cam 3 and roller 4, that is to say, when the injection of fuel is started. However, the roller ring position is controlled as the computer 20 supplies the linear solenoid 29 with a current that is provisionally predetermined based on the engine speed and acceleration pedal angle. The larger the current to the linear solenoid 29, the greater the attractive force of the spool 27. As a result, the area of the groove 271 overlapping the groove 302 is larger so that the pressure within the oil pressure chamber 802 at the right end of the timer piston 8 will be great in relation to the presure within the oil pressure chamber 801 at the left end. Thus, the timer piston 8 moves leftward against the action of the spring 803 and the roller ring 41 is turned through an angular phase in a direction opposite to the turning direction of the drive shaft 2, with the result that the plunger 1 starts moving rightward earlier, namely, the injection of fuel is started earlier.

As the plunger 1 is moved rightward, the fuel in the pumping chamber 9 is compressed, fed via the distribution channel 10 and the delivery valve 12 to the injection valve 13 of any one of the engine cylinders, and thus injected into the engine cylinder. If the solenoid valve 18 remains closed at this time, the free piston 16 keeps the small hole 191 of the pumping chamber closed, so that an amount of fuel equivalent to the stroke volume of the plunger 1 is fully supplied to the injection valve 13.

As will be described later, these phases are the engine phases $\theta_1$ to $\theta_5$. The phase $\theta_1$ is the starting time of fuel injection, which is determined by the position of the roller ring 41. The phase $\theta_5$ is delayed an angular stroke (fixed at about 60° in engine phase) from the phase P$_1$. The fuel-oil ejection rate of the pumping chamber 9 at this time is shown by the line a-b-c-d of the chart B in FIG. 2.

Since the stroke volume of the plunger 1 is so set that the required amount of fuel is exceeded whenever the fuel oil is supplied to the injection valve 12 over the phases $\theta_1$ to $\theta_5$, any excessive fuel must be spilled by the spill mechanism 14. The computer 20 causes the solenoid valve 18 to be energized at the times $\theta_2$ to $\theta_6$, which are provisionally predetermined based on the acceleration pedal angle and engine speed, and to open. This is illustrated at chart A in FIG. 2. The phase $\theta_2$ is included in the period from $\theta_1$ to $\theta_5$. In a little delay time from the phase $\theta_2$ and at the phase $\theta_3$, the free piston 16 starts moving rightward and the left end face 161 thereof opens the small hole 191. The rightward movement of the free piston 16 is due to the fact that the pressure of the pumping chamber 9 acts on the left end face of the free piston 16 and the oil pressure at the right end which is against the pumping chamber pressure is relieved to the spill passage 15 via the solenoid valve 18. Then, the face under the oil pressure of the pumping chamber 9 shifts from the concavity 162 to the entire left end face, whose area is four to six times larger than the area of the concavity 162. Namely, the left end face of the free piston 16 is subjected to oil pressure over a suddenly increased area. The free piston 16 itself moves rightward all at once until the gap between the right end face 163 thereof and the gap sensor 17 becomes zero. Then, the free piston 16 is stopped. As the small hole 191 is opened to the spill passage 15 at the same time, the feed of fuel oil from the pumping chamber 9 to the injection valve 13 is stopped.

The supply amount of fuel oil is reduced at the phase $\theta_3$ where the free piston 16 starts moving rightward. The supply is stopped at the phase $\theta_4$ where the gap between the free piston 16 and the gap sensor 17 becomes zero. The period between the phases $\theta_3$ and $\theta_4$ is extremely short because of the previously mentioned effect of the concavity 162. The supply of fuel oil is stopped at the point e in chart B of FIG. 2.

After that, the plunger 1 stops moving rightward at the phase $\theta_5$ and immediately turns to moving leftward. The pumping chamber 9 is not immediately opened to the intake channel 11 at this time. Because of the setting of a little delay, the pumping chamber 9 is evacuated and the free piston 16 is attracted leftward so that the small hole 191 is closed again. This motion of the free piston 16 is shown in chart C of FIG. 2. This motion of the free piston 16 is transmitted by the gap sensor 17 to the computer 20 which in turn will cause the solenoid valve 18 to be deenergized at the phase $\theta_6$ and in a predetermined time after it is made sure that the free piston 16 has closed the small hole 191.

The computer 20 uses two MRE sensors 22 and 23, as previously described, for detection of the engine speed and phase. The signal from the sensor 22 is illustrated in chart E of FIG. 2, while that from the sensor 23 is in chart D. The signal E is a pulse voltage which is produced at a specified engine phase $\theta_0$ once per turn of the drive shaft 2, that is, once per two turns of the engine. The signal D is also a pulse voltage generated at every 5° turn of the drive shaft 2.

Figure 2:
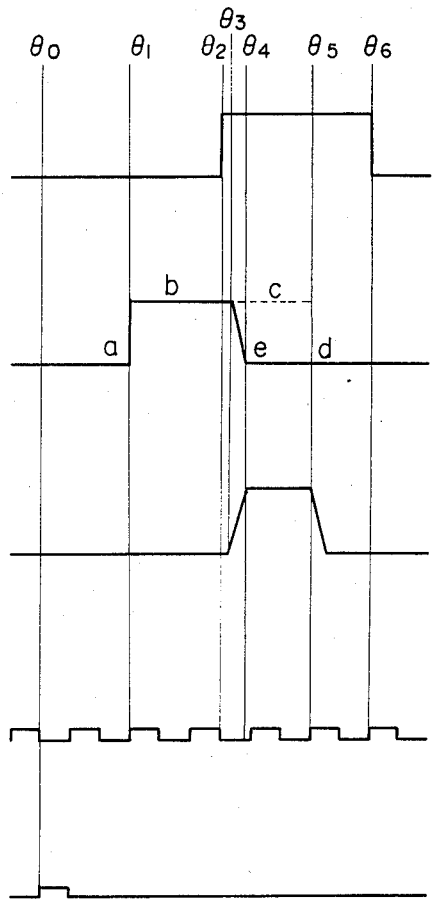
FIG. 2 is a functional time chart of the components of the first embodiment in FIG. 1.

The computer 20 must directly detect two engine phases $\theta_4$ and $\theta_5$ both arriving from the gap sensor 17 as shown in chart C of FIG. 2. If the phase $\theta_5$ can be detected, it is possible to determine, by calculation, the phase $\theta_1$, namely the starting time of injection, as a time earlier by an angular stroke of the plunger 1 (for example, an engine phase of 60°). In case the starting time of fuel injection thus determined is earlier than a time predetermined based on the engine speed and acceleration pedal angle, the current through the linear solenoid 29 is reduced. In a reverse case, the current is increased. Since the period between the times $\theta_1$ and $\theta_3$ should be proportional to the supply amount of fuel oil, the solenoid valve 18 is energized at a time earlier than the phase $\theta_2$ if the phase $\theta_3$ is later than a time predetermined based on the engine speed and acceleration pedal angle. In a reverse case, the energization is done as delayed from the phase $\theta_2$.

Figure 4B:
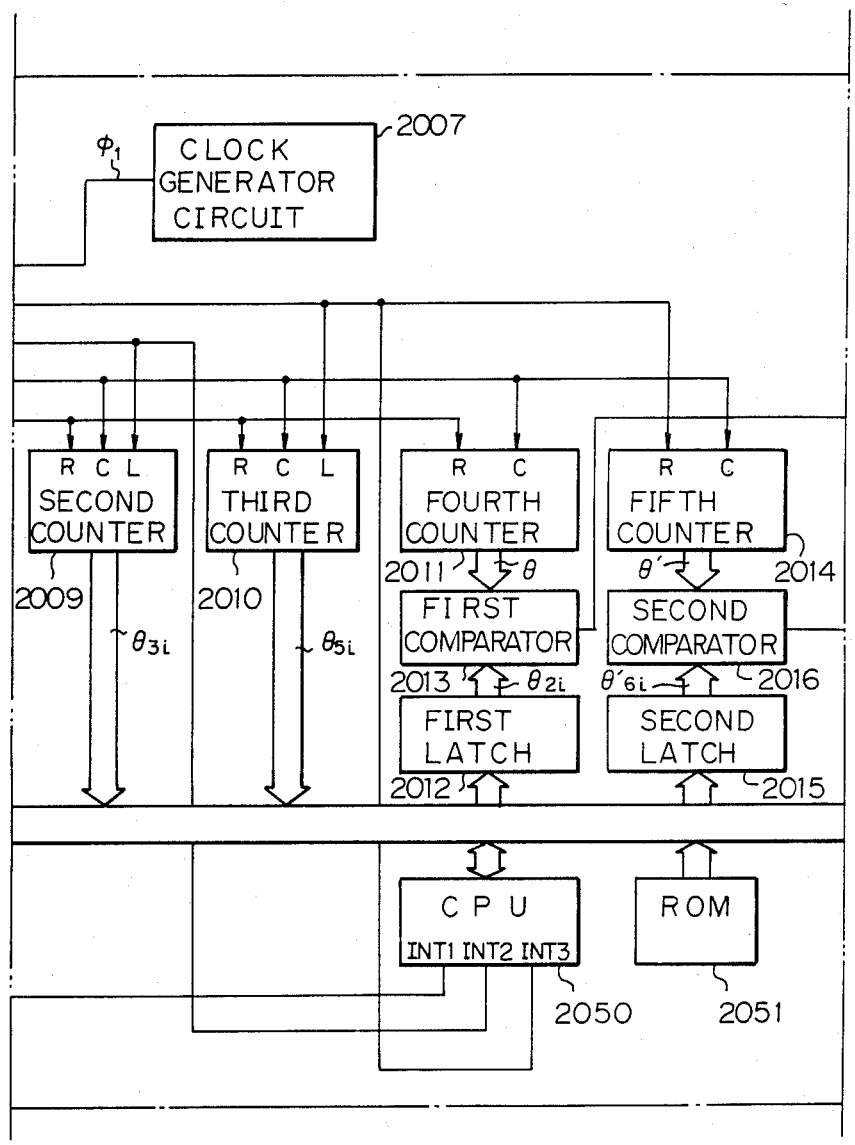
Figure 4C:
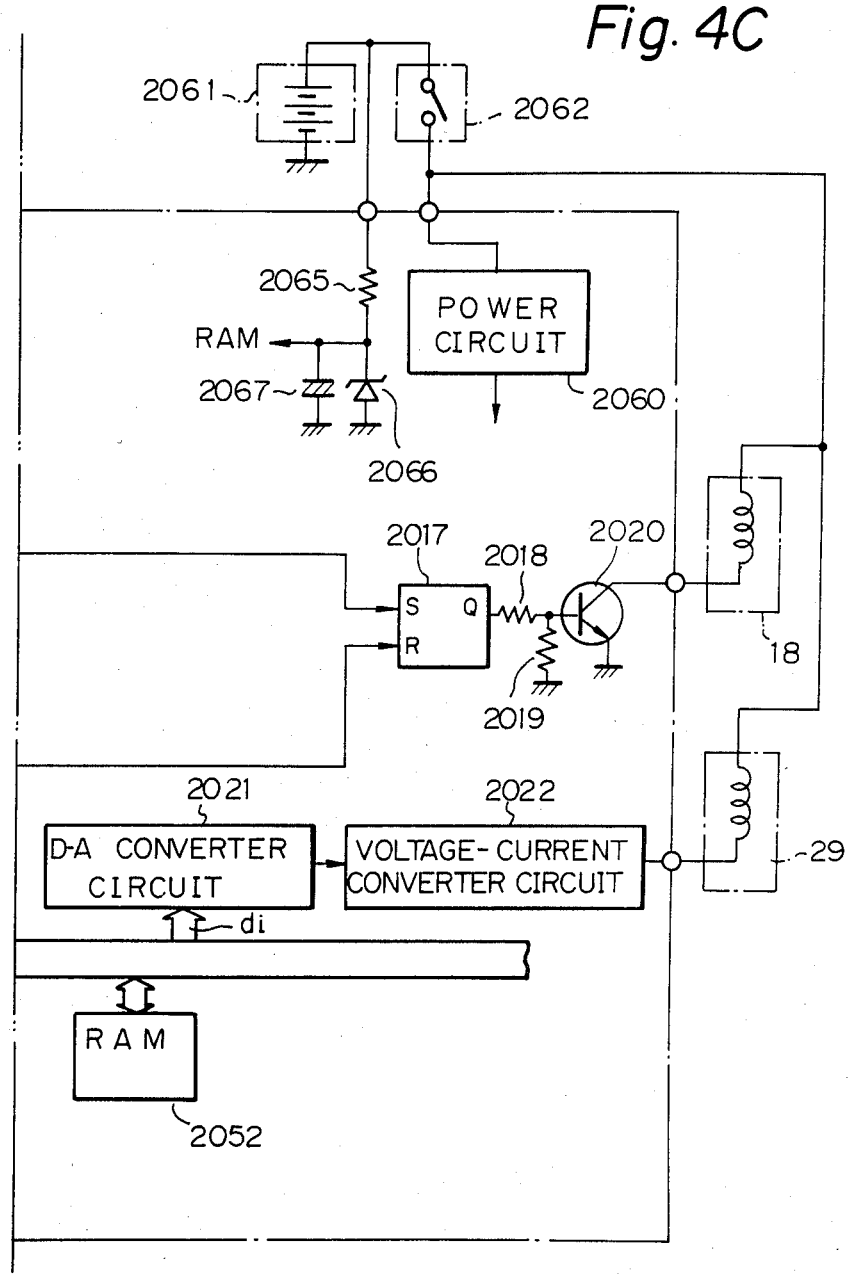
Figure 6A:
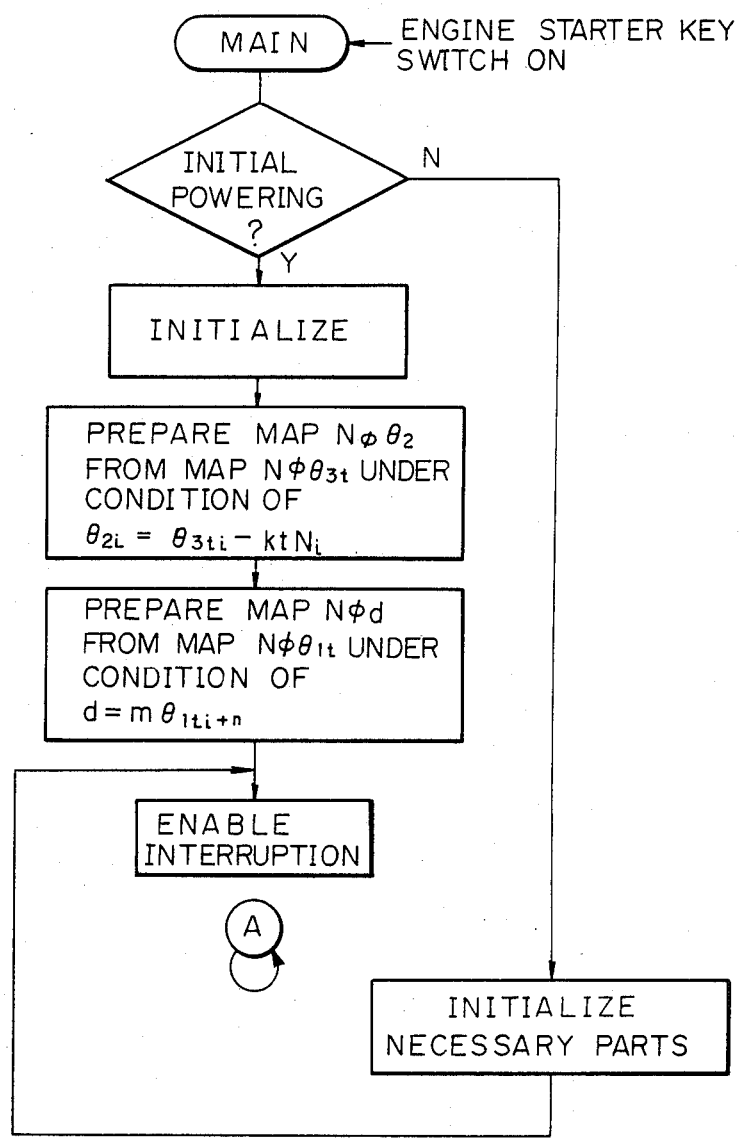
FIG. 6A shows a control flow chart of the MAIN routine.
Figure 6B:
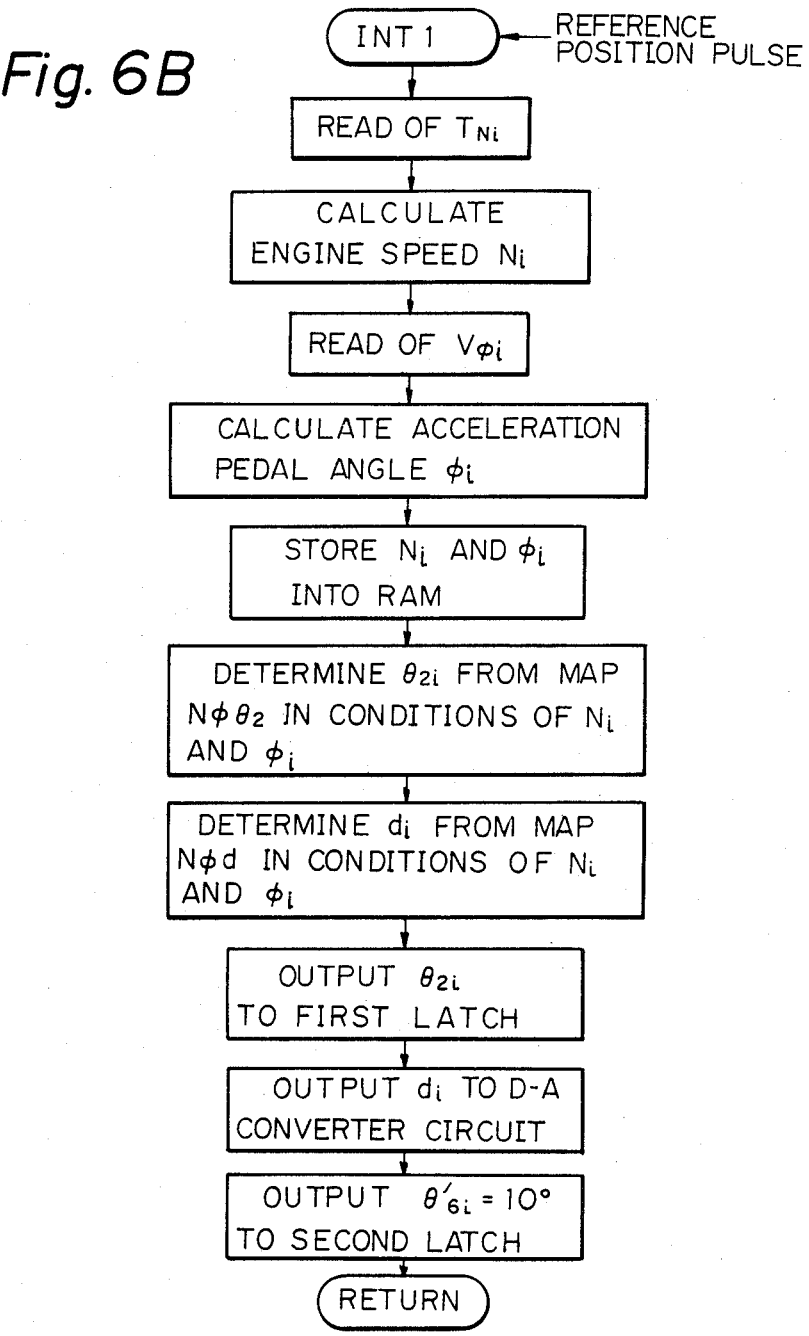
FIG. 6B shows a control flow chart of the INT1 routine.
Figure 6C:
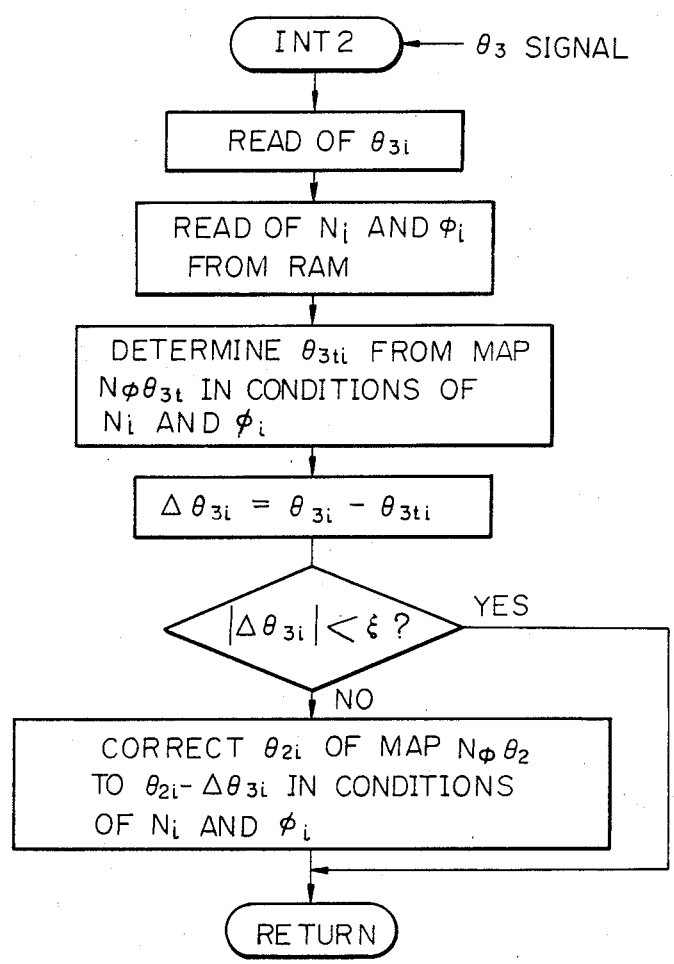
FIG. 6C shows a control flow chart of the INT2 routine.
Figure 6D:
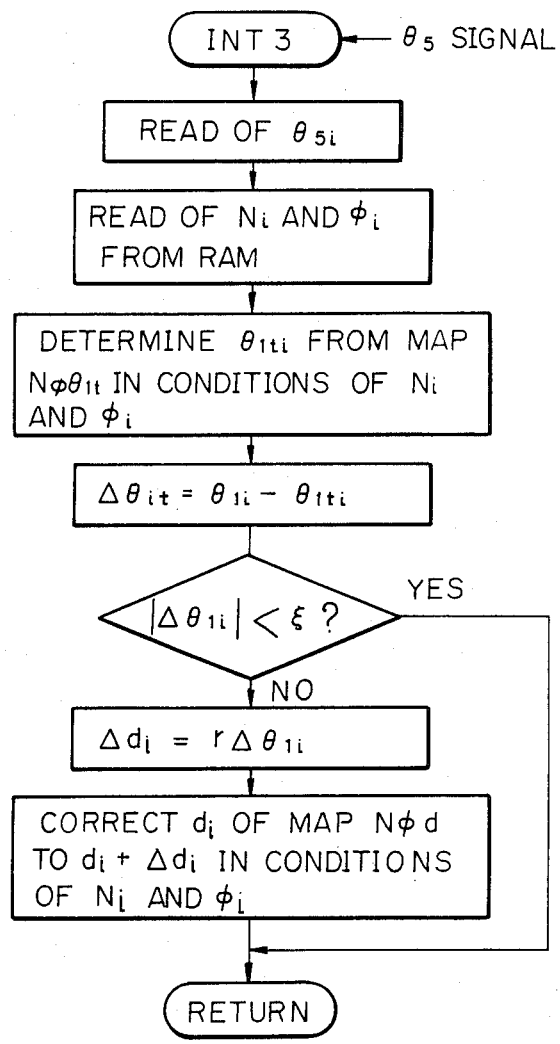
FIG. 6D shows a control flow chart of the INT3 routine.

The control circuit 20, namely, the previously described computer, is constructed and functions as explained below with reference to FIGS. 4A, 4B and 4C, which is a block diagram of the control circuit 20, and to FIG. 5, showing waveforms of signals in the circuit. The control circuit comprises a sensor amplifier 2001 which detects the output from the gap sensor 17 and converts it to a voltage of, for example, 0V to 5V. The sensor amplifier 2001 is so adjusted to proide 0V to 5V, respectively, when the free piston 16 is positioned at the left end within the cylinder 19 and at the right end, respectively. This is as shown at the waveform G of FIG. 5. The control circuit 20 also comprises a first shaping circuit 2002 which is provided for comparing the output from the sensor amplifier 2001 with a reference voltage set by a potentiometer 2003, converting it to digital signals at level 0 to 1, and for producing a level-1 pulse of a short duration, which is in synchronism with the rise and fall of the digital signal. The reference voltage is set at 2.5 V, which is the median of the full stroke of, for example, the free piston 16. It should be noted that this setting may be automatically varied according to the conditions of an internal combustion engine in which the present invention is adopted, or that the setting may be different for the rise of sensor amplifier output signal for the fall thereof. The signal synchronous with the rise of the output signal from the first shaping circuit will be referred to as the $\theta_3$ signal (see the waveform H in FIG. 5), and the signal synchronous with the fall thereof as the $\theta_5$ signal (see the waveform I of FIG. 5). The control circuit 20 further comprises a second shaping circuit 2004 for shaping the waveform of the output signal from the reference position sensor 22 using an MRE for detection of the reference position of the disc which turns along with the drive shaft 2, to produce a level-1, short-duration reference position pulse synchronous with the fall of the output signal from the reference position sensor 22 (the waveform being shown at A of FIG. 5). Also, a third shaping circuit 2005 is provided to shape the waveform of the output signal from the angular position sensor 23 which uses an MRE to detect the concavity and convexity formed at intervals of, for example, 5° in the circumference of the disc 24; multiply the frequency of the signal by 50; and to produce an angular position pulse (see the waveform B of FIG. 5) at a rate of one pulse per 0.1°. Note that phototransistors may be used for the reference position sensor 22 and angular position sensor 23 and that a disc with slits at intervals of 0.1° may be used for the disc 24, thereby eliminating the process of multiplication. The control circuit 20 further comprises an analog-digital (A-D) converter circuit 2006. This converter circuit is intended for A-D conversion of the potentiometer 211 provided to the acceleration pedal 21 to, for example, a digital signal of 12 bits in full scale and for then connecting the signal to a bus line 2053. This output is taken as $V\phi_i$.

Furthermore, a clock generator circuit 2007 is provided to produce a clock signal $\phi_1$ of a stable frequency. The control circuit 20 also comprises a first binary counter 2008, which is latched or reset by the reference position pulse and caused by the clock signal $\phi_1$ to effect up-counting. Namely, the contents of the counter 2008 will be a value corresponding to the period of the reference position pulse, the value being latched and connected to the bus line 2053. This signal is taken as $T_{Ni}$. Also, a second 12-bit binary counter 2009 is incorporated in the control circuit 20. This second binary counter 2009 has a reset input at which the reference position pulse is received, and a clock input to receive an angular position pulse. The second counter 2009 is so arranged as to be latched by the $\theta_3$ signal from the gap sensor 17. That is to say, the contents of this second counter 2009 denote an angle from the reference position and the $\theta_3$ signal. This angle is taken as $\theta_{3i}$. The control circuit 20 comprises a further binary counter 2010 of 12 bits, namely a third one, which receives the reference position pulse at a reset input thereof, and an angular position pulse at a clock input. The counter 2010 is also latched by the $\theta_5$ signal from the gap sensor 17. Thus, the contents of the counter 2010 denote an angle from the reference position to the $\theta_5$ signal. This angle is taken as $\theta_{5i}$. Further, the control circuit 20 has a fourth 12-bit binary counter 2011 provided with reset and clock inputs to receive the reference position pulse and an angular position pulse, respectively. The contents of this fourth counter 2011 denote a momentary angular position from the reference position. This angle is taken as $\theta$. There is further provided a first 12-bit latch 2012 which latches and delivers a starting time $\theta_{2i}$ of power supply to the solenoid valve 18, which has been calculated by a central processing unit (CPU), described later. Also, a first 12-bit comparator 2013 is provided to compare an angular position $\theta$ from the reference position with the starting time $\theta_{2i}$ of solenoid valve energization, and produces a level-1 coincidence signal when $\theta = \theta_{2i}$ (see the waveform D of FIG. 5). The control circuit 20 incorporates furthermore a fifth 12-bit binary counter 2014 which receives at a reset input thereof the $\theta_5$ signal being the fall of gap sensor output signal, and an angular position pulse at a clock input. Therefore, the contents of the fifth counter 2014 denote a momentary angular position after the $\theta_5$ signal is produced, or after the top dead point of ejection stroke. This angular position is taken as $\theta'$. A second 12-bit latch 2015 is provided to produce a value $\theta'_{6i}$ relating to an end time of power supply to the solenoid valve 18, which has been calculated by the CPU. When the energization of the solenoid valve 18 ends after 10° from the generation of the $\theta_5$ signal, a value of $\theta'_{6i} = 10°$ is latched. There is also provided a second comparator 2016 of 12 bits to compare an angular position $\theta'$ from the $\theta_5$ signal with a solenoid valve energization end time $\theta'_{6i}$ and to produce a level-1 coincidence signal (see the waveform E in FIG. 5) when $\theta'_{6i}$ (note that $\theta = \theta_{6i}$ at this time).

A set-reset flip-flop 2017 is provided which has a set input where a coincidence signal of $\theta = \theta_{2i}$ is received, and a reset input at which a coincidence signal of $\theta' = \theta'_{6i}$ arrives. This flip-flop 2017 is set at the starting time $\theta_{2i}$ of solenoid valve energization, and reset at the end time $\theta = \theta_{6i}$ of solenoid valve energization. The coincidence signal of $\theta = \theta_{2i}$ is delivered at level-1 signal, and the signal of $\theta=\theta_{6i}$ is as level-0 signal, to an output terminal Q (see the waveform F of FIG. 5) to turn on and off a transistor 2020 through resistors 2018 and 2019, thereby driving the solenoid valve 18 connected to a collector of the transistor 2020. Thus, the solenoid valve 18 is energized at the time of $\theta=\theta_{2i}$ to start the relief of fuel and deenergized at the time of $\theta=\theta_{6i}$ to close the valve.

Also, a digital-analog (D-A) converter circuit 2021 of 12 bits is provided for D-A conversion of a timer position signal $d_i$ calculated by the CPU to drive the linear solenoid 29 via a voltage-current transformer circuit 2022.

The CPU referred to in the foregoing is a 12-bit CPU 2050 supplied at interrupt terminals INT1, INT2 and INT3 thereof with the reference position pulse, $\theta_3$ signal, and $\theta_5$ signal, respectively. The priority of these terminals for interrupt is INT1, INT2, and INT3, in that order. The CPU 2050 reads an A-D conversion $V_{\phi i}$ of the acceleration pedal angle, contents $T_{Ni}$ of the counter 2008, contents $\theta_{3i}$ of the counter 2009, and contents $\theta_{5i}$ of the counter 2010 via the bus line 2053 and calculates and delivers an optimum time and duration of fuel injection.

The control circuit 20 also incorporates a read only memory (ROM) 2051 which stores programs and data for the CPU. A work random access memory (RAM) 2052 is also provided for the CPU 2050. This work RAM 2052 is so arranged as to always be energized even when an engine starter key switch 2062 is turned off, thereby maintaining the contents thereof. A power circuit 2060 is provided to stabilize voltage supplied from a battery 2061 through the engine starter key switch 2062 and to then supply the power to various parts. Also, arrangements are made so that the work RAM 2052 is always supplied with the voltage of the battery 2061 after being stabilized through a resistor 2065, Zener diode 2066, and capacitor 2067.

The control circuit is constructed as explained in the foregoing and functions as follows:

In FIGS. 6A, 6B, 6C and 6D are shown program flow charts. Since the control is effected by the CPU 2050, an explanation will be made along with the operation of the CPU 2050.

There are available four process routines INT1, INT2, INT3, and MAIN, with a priority of that order. The first three are interrupt routines and are not started at one time, which means that the priority among such programs is not important. However, no interrupt is allowable immediately after the engine starter key switch 2062. Each of these routines will be described.

Assume here that the internal combustion engine is running under certain conditions. The INT1 routine is intended for use in actuation of the solenoid valve 18 and linear solenoid 29 to control the start and end times of fuel injection. This INT1 routine is started with the interrupt due to the rise of the reference position pulse. First, the CPU 2050 reads a time $T_{Ni}$ of reference position pulse from the counter 2008 and calculates a speed of the engine $N_i$ from the value of the pulse time $T_{Ni}$. The CPU 2050 reads from the A-D converter circuit 2006 an output voltage $V_{\phi i}$ of the acceleration pedal angle sensor 211 and calculates an acceleration pedal angle $\phi_i$ from the value of the output voltage $V\phi_i$. The values $N_i$ and $\phi_i$ are stored in the work RAM 2052 for later use. Next, based on the values $N_i$ and $\phi_i$, a map $N\phi\theta_2$ stored in the work RAM 2052 is referred to determine a starting time $\theta_{2i}$ of solenoid valve energization with $N_i$ and $\phi_i$. The map $N\phi\theta_2$ is rewritten, as will be described later, each time a correction is effected, and it will not be destroyed since it is backed up even when the engine starter key switch 2062 is turned off. However, since the map includes no correct data at time of initial powering, the MAIN routine is executed, as will be described later, to write an initial value into the map. Then, a map $N\phi d$ stored in the work RAM 2052 is drawn based on the values $N_i$ and $\phi_i$ to determine a data $d_i$ corresponding to a linear solenoid drive current with Ni and $\phi_i$. The starting time $\theta_{2i}$ of solenoid valve energization and the date $d_i$, thus determined, are delivered to the first latch 2012 and D-A converter circuit 2021, respectively. The second latch 2015 to determine an end time of solenoid valve energization is supplied with, for example $\theta'_{6i}=10°$. This value is applicable to the case in which the energization is end at the angular position of 10° after the ejection stroke top dead point $\theta_5$, but it may be changed by a certain time after the top dead point $\theta_5$ or depending upon the conditions of the engine. When the output of $\theta_{2i}$, $d_i$, and $\theta'_{6i}$ ends, the INT1 routine also ends. Subsequently, the solenoid valve 18 and linear solenoid 29 are automatically operated at respective predetermined points of time by the fourth counter 2011, first comparator 2013, fifth counter 2014, second comparator 2016, flip-flop 1027, transistor 2020, D-A converter circuit 2021 and the voltage-current converter circuit 2022, to control the starting and end times of fuel injection. As the operation concerning this section has been previously described with respect to the construction of the control circuit 20, no further explanation is necessary.

The INT2 routine is to be used for detecting and feeding back the position of the free piston 16 in order to obtain a desired timing of driving the free piston 16. This INT2 routine is started with the interrupt due to the $\theta_3$ signal of the rise of a gap sensor output signal. First, the CPU 2050 reads from the second counter 2009 an angular position $\theta_{3i}$ where the $\theta_3$ signal has developed. The $\theta_{3i}$ is a value when the free piston 16 for relief of the fuel comes to the middle of its whole stroke and corresponds with an end time of fuel injection. This $\theta_{3i}$ will be taken as the end time of fuel injection in the following explanation. In the operation of the INT1 routine after the $\theta_{3i}$ is read by the CPU 2050, the latter reads out an engine speed $N_i$ and acceleration pedal angle $\phi_i$. A target value $N\phi\theta_{3t}$ of injection end time previously determined by a bench test or the like and stored as data in the ROM 2051 is referred to so as to determine target value $\theta_{3ti}$ of $N_i$ and $\phi_i$. Next, an actual end time $\theta_{3i}$ of fuel injection is compared with the target value $\theta_{3ti}$. The difference as the result of this comparison is taken as $\Delta\theta_{3i}=\theta_{3i}-\theta_{3ti}$. The absolute value of this difference is compared with a value $\epsilon$ to learn whether the former is larger or smaller than the latter. If it is smaller, the actual end time of fuel injection $\theta_{3i}$ is considered to be coincident with the target value $\theta_{3ti}$, and so any correction is not effected but the operation proceeds to the return process. If the absolute value of $\Delta\theta_{3i}$ is greater than the value $\epsilon$, the actual end time of fuel injection is considered to deviate from the target value $\theta_{3ti}$, and correction is conducted.

The correction is made by substituting $\theta_{2t}-\Delta\theta_{3i}$ for the value $\theta_{2i}$ in the conditions $N_i$ and $\phi_i$ of the map $N\phi\theta_2$. Assume that the target value $\theta_{3ti}$ of injection end time is, for example, 30° when $N_i=100$ rpm and $\phi_i=40\%$ and that the value $\theta_{2i}$ of a map $N\phi\theta_2$ of solenoid valve starting time prepared taking consideration of any possible delay time of the solenoid valve 18 and free piston 16 is 25°. In this condition, if the actual end time of fuel injection $\theta_{3i}$ is 32° although the solenoid valve 18 is energized in the condition of $\theta_2=25°$, $\Delta\theta_{3i}=\theta_{3i}-\theta_{3ti}=32°-30°=2°$, which means that the delay is 2°. Here, the value $\Delta\theta_{3i}$ is substracted from the value $\theta_{2i}$ of the map N$\phi_2$. By providing a new $\theta_{2i}$ which is $25°-2°=23°$, the solenoid valve 18 and free piston 16 are advanced by 2° for correction. As the result of this correction, the solenoid valve 18 will be energized at an angular position of $\theta_2=23°$ for a next fuel injection and also it is anticipated that the actual end time of fuel injection $\theta_{3i}$ will approximate the target value $\theta_{3ti}=30°$. If the actual end time of fuel injection $\theta_{3i}$ is advanced from the target value $\theta_{3ti}$, the latter can be attained by effecting a correction to delay the solenoid valve 18 and free piston 16. With the fuel supply apparatus according to the present invention, the actual end time of fuel injection $\theta_{3i}$ is always thus supervised, and if it deviates from a target value $\theta_{3ti}$, the solenoid valve and free piston are feedback-controlled with a correction for such deviation or difference. Thus, any problems of a fuel supply system for an internal combustion engine, such as nonuniformity or degradation with lapse of time, can be solved and the fuel injection can be ended always as optimally timed. Furthermore, since a correction of the end time of fuel injection is effected in the form of a map for individual engine operating conditions $N_i$ and $\phi_i$, the inventive fuel supply apparatus can provide for a fine and high-precision correction as compared with the prior art corrections on power voltage and engine speed.

The INT3 routine will be described in the following. This routine is used for control of the time of fuel injection. The INT3 routine is started by the $\theta_5$ signal developed at the fall of the output signal from the gap sensor 17, namely, at the fuel ejection stroke top dead point of the plunger 1. First, the CPU 2050 reads the angular position $\theta_{5i}$ of the top dead point from the third counter 2010. Since the ejection starting time of fuel injection stroke, or starting time of fuel injection is considered to be an angle, for example, 60° from the top dead point, an actual starting time of fuel injection $\theta_{1i}$ is calculated from $\theta_{1i}=\theta_{5i}-60°$. Next, the CPU 2050 reads out the engine speed $N_i$ and acceleration pedal angle $\phi_i$ stored in the work RAM 2052. A map N$\phi\theta_{1t}$ of starting time of fuel injection previously determined by a bench test or the like and stored as data in the ROM 2051 is referred to so as to determine a target value $\theta_{1ti}$ of injection starting time in the conditions of $N_i$ and $\phi_i$. Next, the actual starting time of fuel injection $\theta_{1i}$ is compared with the target value $\theta_{1ti}$, and the difference $\Delta\theta_{1i}$ is taken as $\theta_{1i}-\theta_{1ti}$. The absolute value of this difference is compared with a certain value $\xi$. If the absolute value is smaller than the value $\xi$, the actual starting time of fuel injection $\theta_{1i}$ is considered to coincide with the target value $\theta_{1ti}$ and so no correction is done. Thus the operation proceeds to the return process. If the absolute value is greater than the value $\xi$, the actual starting time of fuel injection is taken as deviating from the target value $\theta_{1ti}$. In this case, correction is to be conducted. The procedure of this correction is similar to that with the previously mentioned INT2 routine; a map N$\phi$d stored in the work RAM 2052 is altered to a value $d_i+\Delta d_i$ in the conditions of $N_i$ and $\phi_i$. As this value $\Delta d_i$ is a value $\gamma\Delta\theta_{1i}$, a multiplication of the target value $\theta_{1ti}$ by a factor $\gamma$ because it is necessary to convert the angular position data $\theta_{1i}$ to a current value data $\Delta d_i$ since a data to be provided to the D-A converter circuit, namely, a value corresponding to a current through the linear seolenoid 29, is stored in the map N$\phi$d. The particulars and effect of feedback of the actual starting time of fuel injection are the same as those described with respect to the INT2 routine, and so it is not necessary to explain them here again.

The MAIN routine will be explained hereinbelow. While any one of the INT1, INT2, and INT3 routines is not being executed, this MAIN routine is always executed. The inventive system is so arranged as to be started from the top of the MAIN routine when the engine starter key switch 2062 is turned on. At the initial powering with which the control circuit 20 has been set up, the maps N$\phi\theta_2$ and N$\phi$d in the previously described work RAM 2052 are not yet established. Note that the map data in the work RAM 2052 are reserved since they are backed up, at the second and subsequent settings of the engine starter key switch 2062 to ON. Thus, at the initial powering, it is necessary to initialize the map data. This operation is to be done by executing the MAIN routine. First, it is checked whether the powering is the initial one or not. If it is, the map N$\phi\theta_2$ is prepared by calculation from the map N$\phi\theta_{3i}$ stored in the work RAM 2051 and it is stored in the RAM 2052. Assume, for example, that the response time solenoid valve 18 and free piston 16 is a constant value t. The value $\theta_{2i}$ in the conditions of $N_i$ and $\phi_i$ is determined to be $\theta_{1i}=\theta_{3ti}-$ktN$_i$ (k being a factor for conversion of an engine speed to an angular position). Then, a map N$\phi$d of current through the linear solenoid 29 is prepared in the work RAM 2052 by calculation from the map of injection starting time target value N$\phi\theta_{1t}$ stored in the ROM 2051. Assume, for example, that the value of current through the linear solenoid 29 is in a linear relation with the injection starting time. The value $d_i$ in the conditions $N_i$ and $\phi_i$ is determined to be $d_i=m\theta_{1ti}+n$. The values m and n have been previously determined from the relation between the linear-solenoid current value and fuel injection starting time. It should be noted that the map initial data may be previously stored in the ROM 2051, not by means of calculation, and transferred to the work RAM 2052. If the powering is not the initial one, all necessary parts are initialized to permit interrupt, and an idle state is established.

As explained in the foregoing, the starting and end times of fuel injection are initially controlled based on provisional data determined by a bench test or the like. However, in case such times deviate from their respective target values due to changes in the characteristics of the injection pump, solenoid valve, linear solenoid, free piston, injection nozzle, etc., the inventive apparatus can detect such changes, conduct proper corrections, and feed them back to ensure fuel injection control which catches up with any target values. It should be noted that if the INT2 and INT3 routines are omitted, the fuel injection is subject to a simple programmed control without any feedback control. Since the gap sensor and its associated read circuit are thus unnecessary, the apparatus according to the present invention can be simply designed. Note also that the construction and operation having been described in the foregoing are given just by way of example for illustration of the present invention and they can be embodied in various many forms; the present invention is not limited to them. According to the preferred embodiments having been stated above, the starting time $\theta_{2i}$ of solenoid valve energization is corrected based on the value of injection end time $\theta_{3ti}$ previously determined by a bench test or the like, but taking account of the fuel injection during the period from $\theta_{1i}$ to $\theta_{3i}$, the value $\theta_{2i}$ may be corrected in such a manner that the value $\theta_{3i}-\theta_{1i}$ follows up the data on injection period which has been previously determined. In this case, if the injection period follows up a correct value even with any incomplete control of the injection time, a predetermined amount of fuel is injected, which results in a more reliable control of fuel injection.

Figure 3:
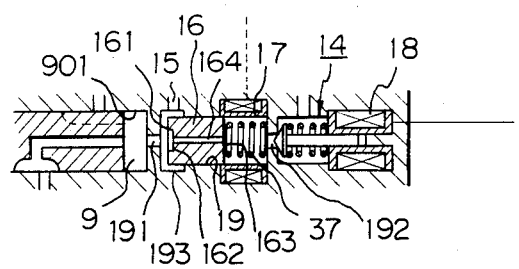
FIG. 3 is a sectional view of the essential parts of a second embodiment of the present invention.

In the embodiment shown in FIG. 1, the free piston 16 may be alternatively urged by a spring 37. Also the gap sensor 17 is provided in the cylinder 19, but the axial hole of the gap sensor 17 may be used as a part of the cylinder. A small hole may be formed through the piston 16 and it will further enhance the function of the inventive apparatus. An embodiment including the above is illustrated in FIG. 3. In this embodiment, a spill mechanism 14 comprises a piston 16 which acts as a valve to lead and stop the oil pressure from a pumping chamber to a spill passage 15, a spring 37 to force the piston 16 toward the pumping chamber 9, a gap sensor 17 to detect the position of the piston 16, and a solenoid valve 18 which drives and controls the piston 16. The piston 16 has a left and right end faces 161 and 163 which communicate with each other through a small diameter through hole 164 formed along the axis of the piston. At the side of the left end face 161, the through hole 164 is opened out to a concavity 162. Thus, when the piston 16 is positioned at the left end as viewed on the drawing and the left end face 161 thereof closes the small hole 191 off the spill passage 15, the oil pressure in the pumping chamber 9 acts on the right end face 163 via the through hole 164 to forcibly stop the oil pressure from the pumping chamber 9 from spilling into the spill passage 15. The gap sensor 17 is a compact coil and coaxial with the piston 16. The gap sensor 17 is hollow around the axis 171 thereof. This central space is coaxial with the cylinder 19 and also has a same diameter as the latter. The gap sensor 17 is located at the right side of the piston 16 and forms the right end of the cylinder 19. The spring 37 is provided in the cylinder 19 to prevent the piston 16 from blocking a small hole 192 located at the right side as well as to shift the piston 16 leftward in quick response to the intake stroke of the pumping chamber 9. Note that, different from the embodiment shown in FIG. 1, the annular groove 193 formed in the inner circumference of the cylinder 19 is located at the left end of the cylinder in this case. The reason is as follows: Since the oil pressure acting on the left end face 163 of the piston makes positive the valve action of the left end face 161, the spill passage 15 does not have to be closed by the outer circumference of the piston.

Although the embodiments of the preset invention have been described with reference to the attached drawings, many modifications and variations may be made, as obvious to those skilled in the art, without departing from the scope of the invention.

We claim:

1. A fuel injection apparatus for an internal combustion engine to feed fuel to a fuel injection valve, comprising:
    casing means for housing a first cylinder therein;
    a plunger slidably provided within said first cylinder to define therein a pumping chamber to feed under pressure fuel from said pumping chamber to said fuel injection valve;
    means for feeding fuel in a fuel tank into said pumping chamber;
    means for selectively spilling a portion of said fuel from said pumping chamber, said spilling means including
        a second cylinder which is communicated with said pumping chamber,
        a piston slidably provided in said second cylinder,
        a first passage for spilling said fuel, and
        a second passage to which pressure of a low pressure chamber formed in said casing means can be led, said first passage being opened and closed by said piston, one end face of said piston being acted on by pressure of said pumping chamber, the other end face of said piston being able to be acted on by a pressure of said low pressure chamber, said piston normally closing said first passage and, when the pressure on said one end face is higher than the pressure on said other end face, being displaced to open said first passage;
    said apparatus further comprising
    solenoid valve means for controllably opening and closing said second passage, wherein a concavity is formed in the end face of said piston facing said pumping chamber, and the pressure within said pumping chamber acts on only said concavity when said piston closes said first passage.

2. An apparatus as set forth in claim 1, wherein said piston is forced under the action of a spring so as to close said first passage.

3. A fuel injection apparatus for an internal combustion engine to feed fuel to a fuel injection valve, comprising:
    casing means for housing a first cylinder therein;
    a plunger slidably provided within said first cylinder to define a pumping chamber to feed under pressure fuel from said pumping chamber to said fuel injection valve;
    means for feeding fuel in a fuel tank into said pumping chamber;
    means for selectively spilling a portion of said fuel from said pumping chamber, said spilling means including
        a second cylinder which is communicated with said pumping chamber,
        a piston slidably provided in said second cylinder,
        a first passage for spilling said fuel, and
        a second passage to which pressure of a low pressure chamber formed in said casing means can be led, said first passage being opened and closed by said piston, one end face of said piston being acted on by pressure of said pumping chamber, the other end face of said piston being able to be acted on by pressure of said low pressure chamber, said piston normally closing said first passage and, when the pressure on said one end face is higher than the pressure on said other end face, being displaced to open said first passage; said apparatus further comprising
    solenoid valve means for controllably opening and closing said second passage; and
    means for detecting the position of said piston within said second cylinder, said detecting means detecting a period of fuel spill to said fuel tank based on the position of said piston, said solenoid valve being driven according to said period of fuel spill to selectively close said second passage thus causing said piston to close said first passage to feed the fuel to said fuel injection valve, and to selectively open said second passage to cause said piston to open said first passage to thereby spill excessive fuel.

4. A fuel injection apparatus for an internal combustion engine to feed fuel to a fuel injection valve, comprising:

casing means for housing a first cylinder therein;

a plunger slidably provided within said first cylinder to define therein a pumping chamber to feed under pressure fuel from said pumping chamber to said fuel injection valve;

means for selectively spilling a portion of said fuel from said pumping chamber, said spilling means including a second cylinder which is communicated with said pumping chamber, a piston slidably provided in said second cylinder, a first passage for spilling said fuel, and a second passage to which pressure of a low pressure chamber formed in said casing means can be led, said first passage being opened and closed by said piston, one end face of said piston being acted on by pressure of said pumping chamber, the other end face of said piston being able to be acted on by pressure of said low pressure chamber, said piston normally closing said first passage and, when the pressure on said one end face is higher than the pressure on said other end face, being displaced to open said first passage; said apparatus further comprising solenoid valve means for controllably opening and closing said second passage;

means for detecting the position of said piston within said second cylinder, said detecting means detecting an end time of fuel spill based on the position of said piston; and drive means of said plunger for controlling the starting time of fuel supply to said fuel injection valve according to said position detected by said detecting means, said solenoid valve selectively closing said second passage to cause said piston to close said first passage to thereby feed fuel to said fuel injection valve, and selectively opening said second passage to cause said piston to open said first passage to thereby spill excessive fuel.

* * * * *